Oct. 28, 1924.

H. J. GOSS 1,513,236

MACHINE FOR MAKING BOXES

Filed Jan. 2, 1923

Inventor:
Harold J. Goss
by George A. Rockwell
Atty

Oct. 28, 1924.
H. J. GOSS
1,513,236
MACHINE FOR MAKING BOXES
Filed Jan. 2, 1923
8 Sheets-Sheet 2
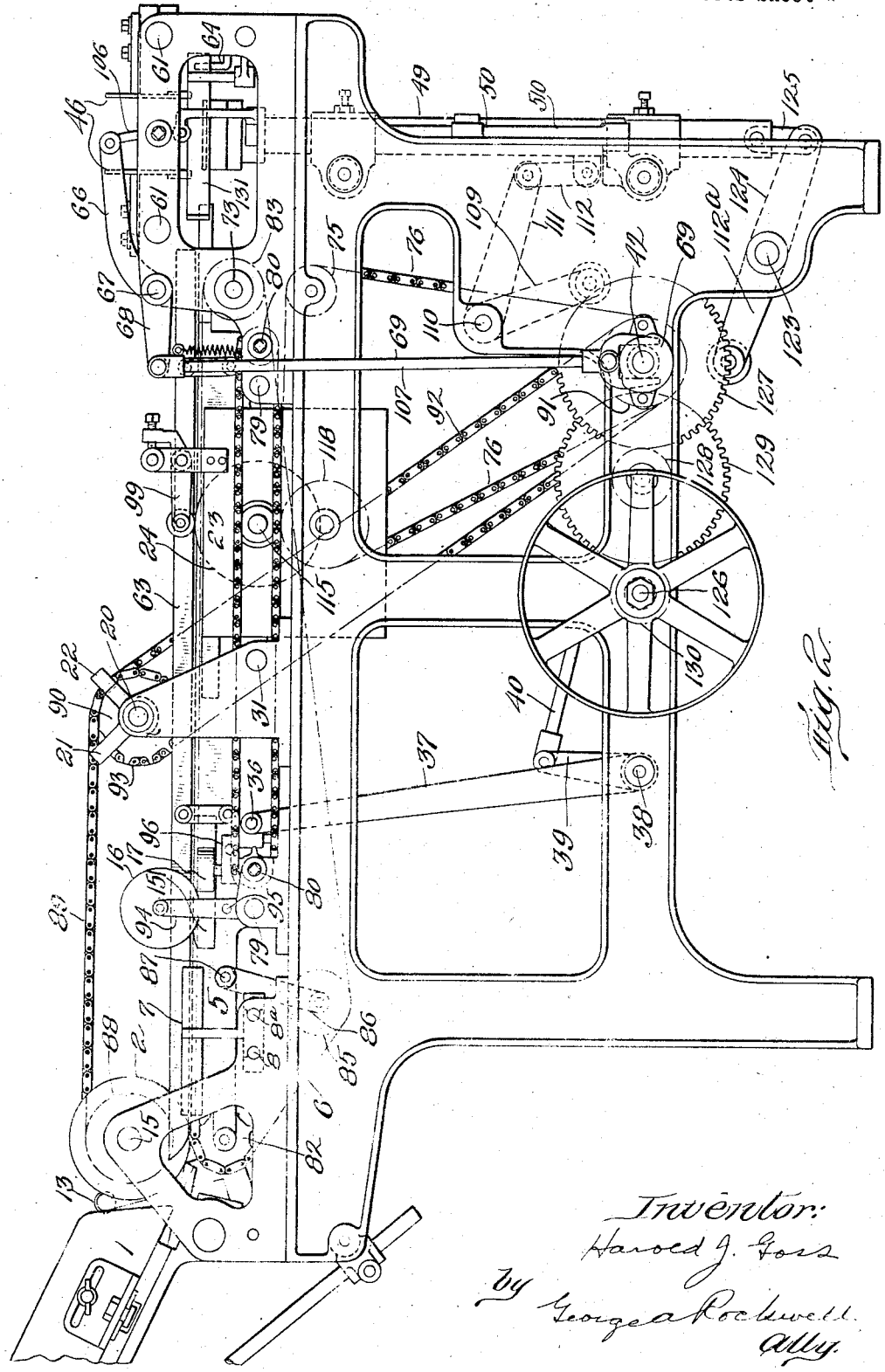
Inventor:
Harold J. Goss
by George A. Rockwell
Atty.

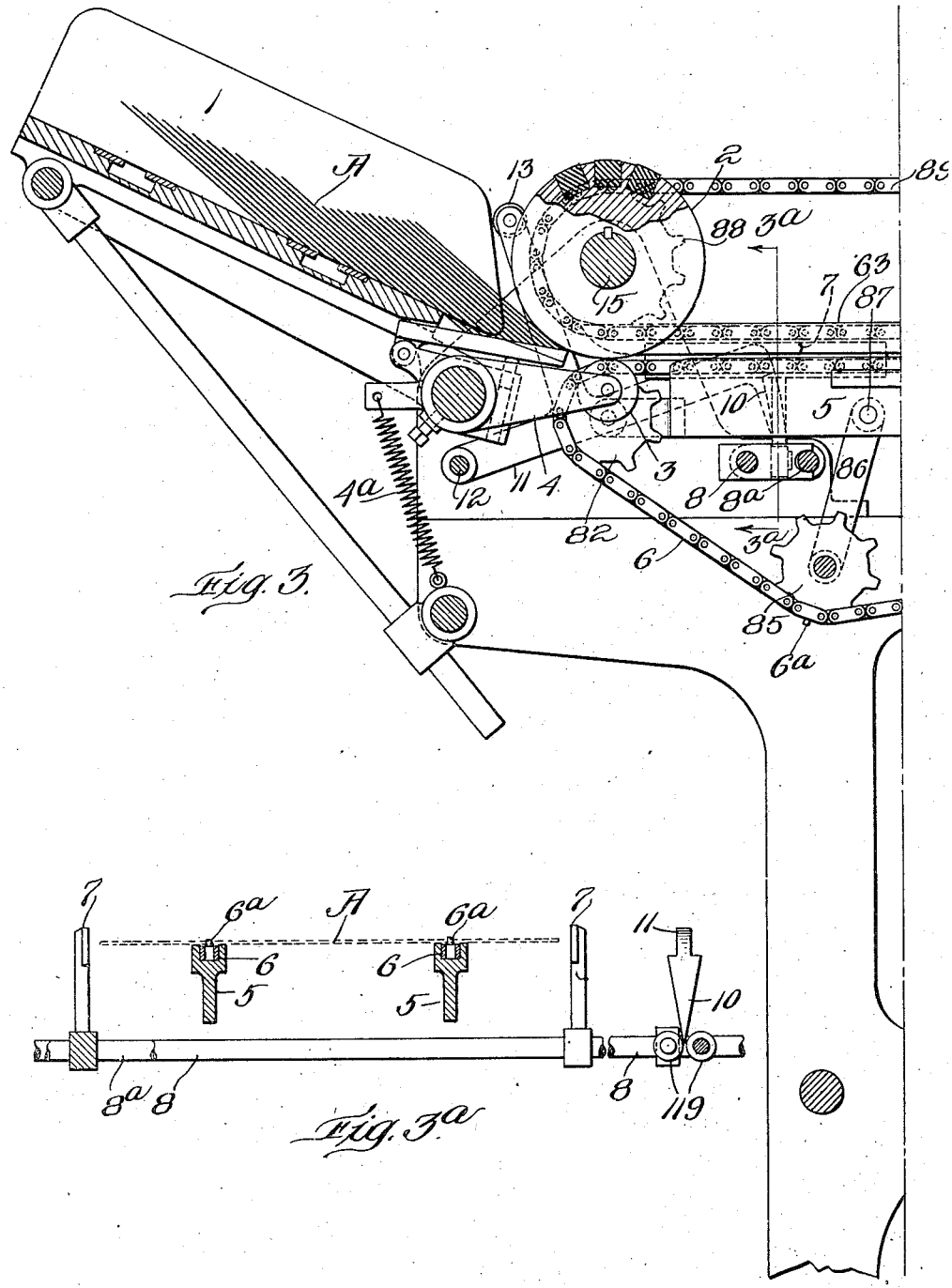

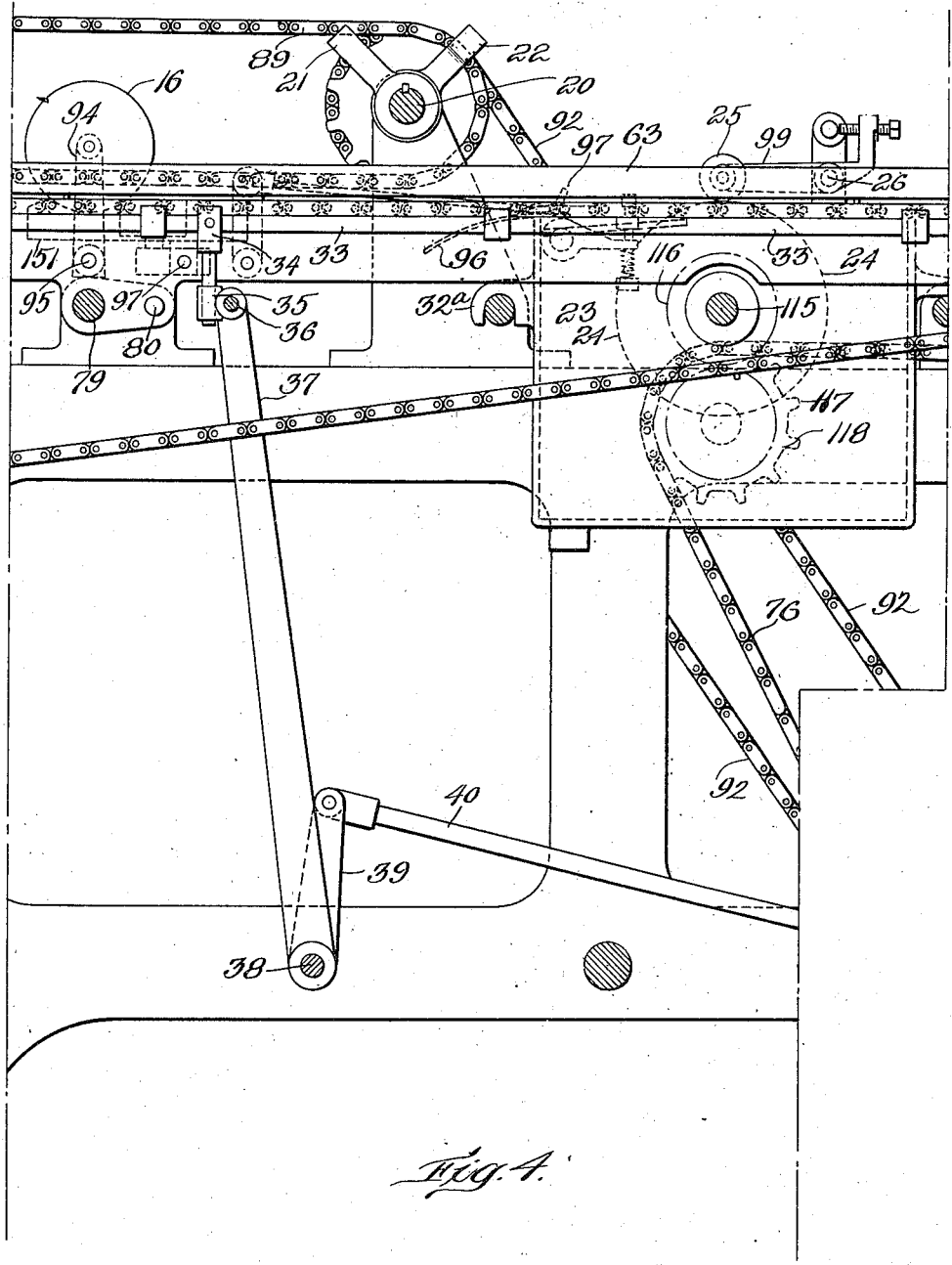

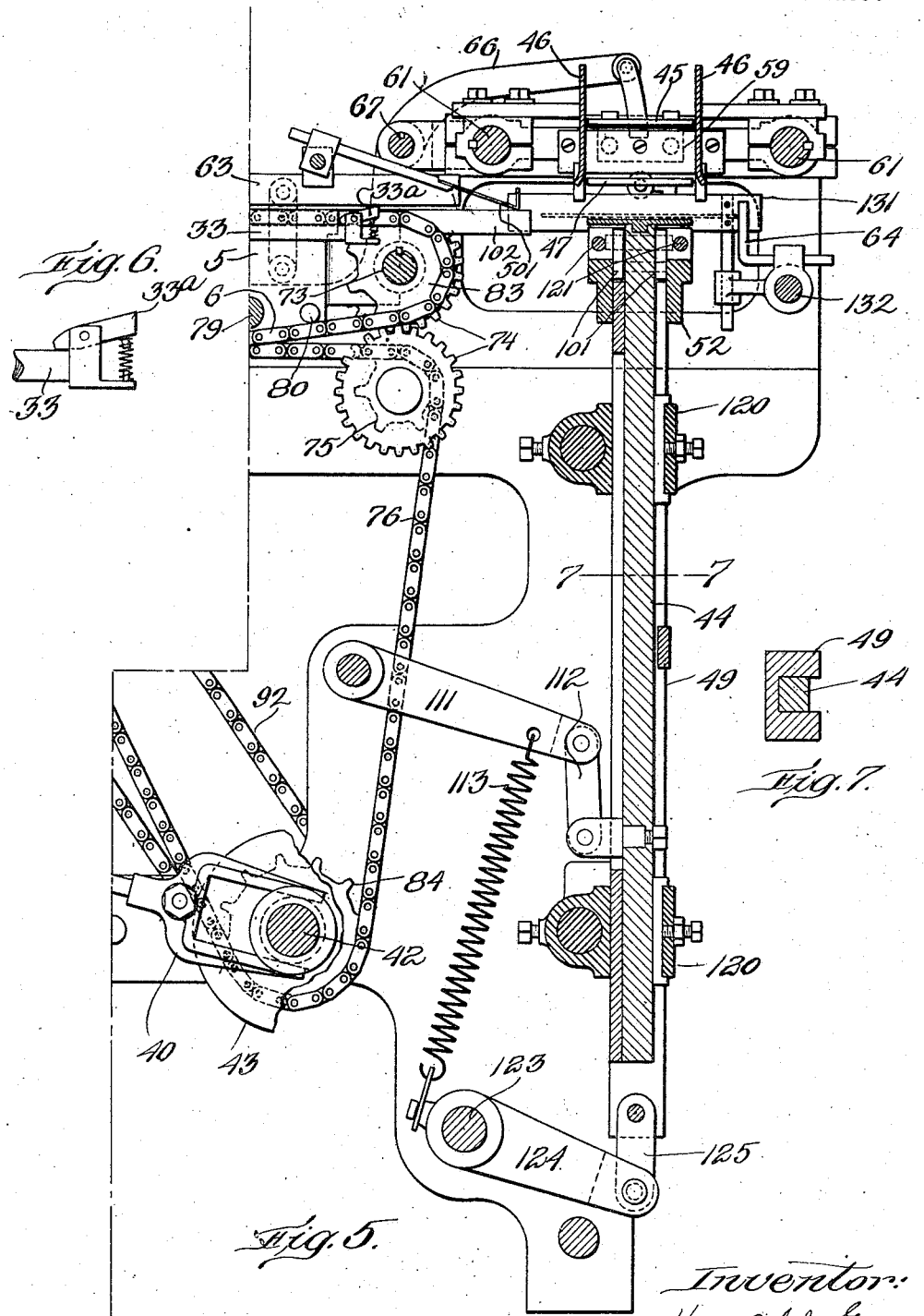

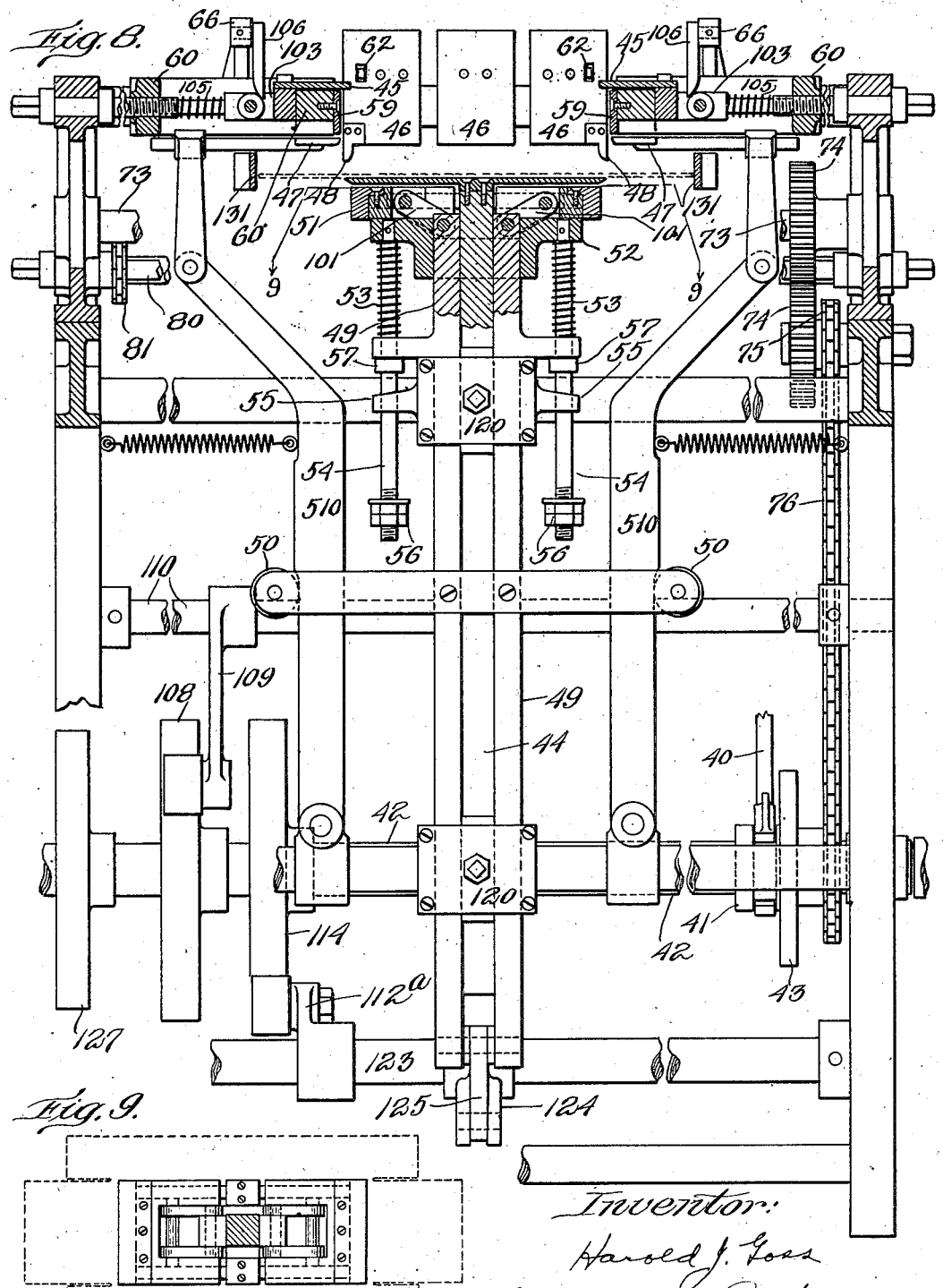

Inventor:
Harold J. Goss
by George A Rockwell,
atty.

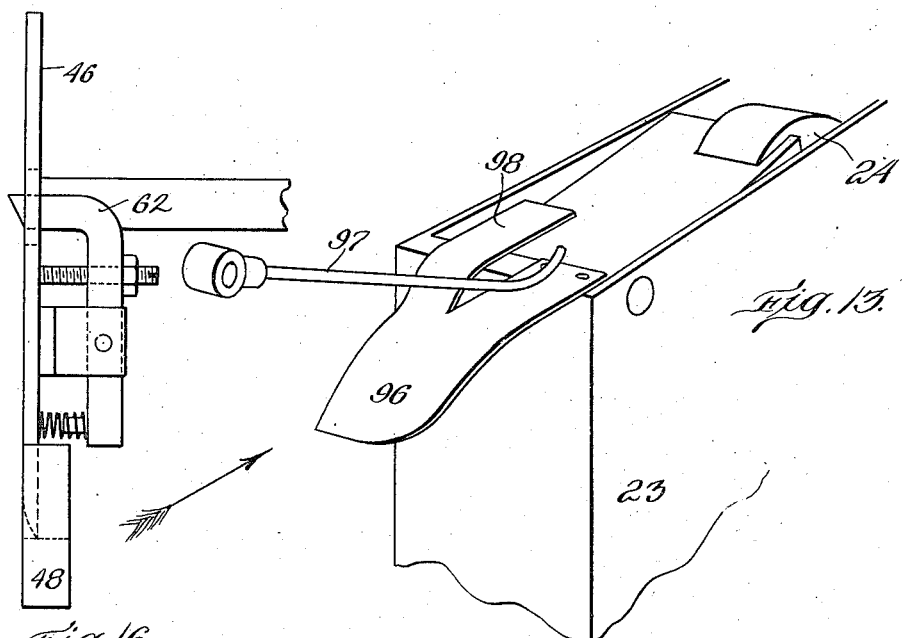
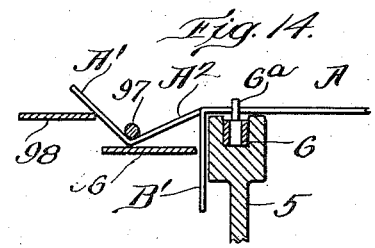
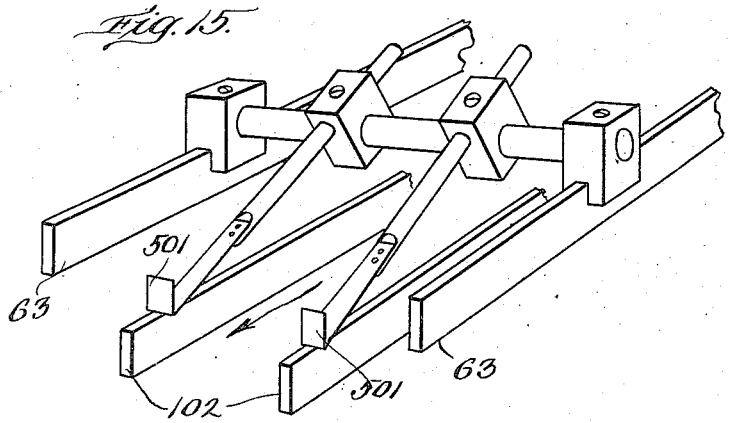

Patented Oct. 28, 1924.

1,513,236

UNITED STATES PATENT OFFICE.

HAROLD J. GOSS, OF NASHUA, NEW HAMPSHIRE, ASSIGNOR, BY MESNE ASSIGNMENTS, TO THE LAKE ERIE TRUST COMPANY, OF CLEVELAND, OHIO, A CORPORATION OF OHIO.

MACHINE FOR MAKING BOXES.

Application filed January 2, 1923. Serial No. 610,143.

*To all whom it may concern:*

Be it known that I, HAROLD J. GOSS, a citizen of the United States, and resident of Nashua, in the county of Hillsborough and State of New Hampshire, have invented a new and useful Machine for Making Boxes, of which the following is a specification.

My invention relates to box making machines and particularly to machines for making paper boxes, its object being to improve the construction and mode of operation thereof and to provide a machine of this class which will expeditiously and efficiently convert flat blanks into finished boxes or box sections.

To these ends my invention consists of a box making machine having the peculiar features of construction and mode of operation set forth in the following description, the novel features of the invention being particularly pointed out and defined in the claims at the close thereof.

In the accompanying drawings:

Figure 2 is a side elevation of the machine shown in Fig. 1.

Figure 1:
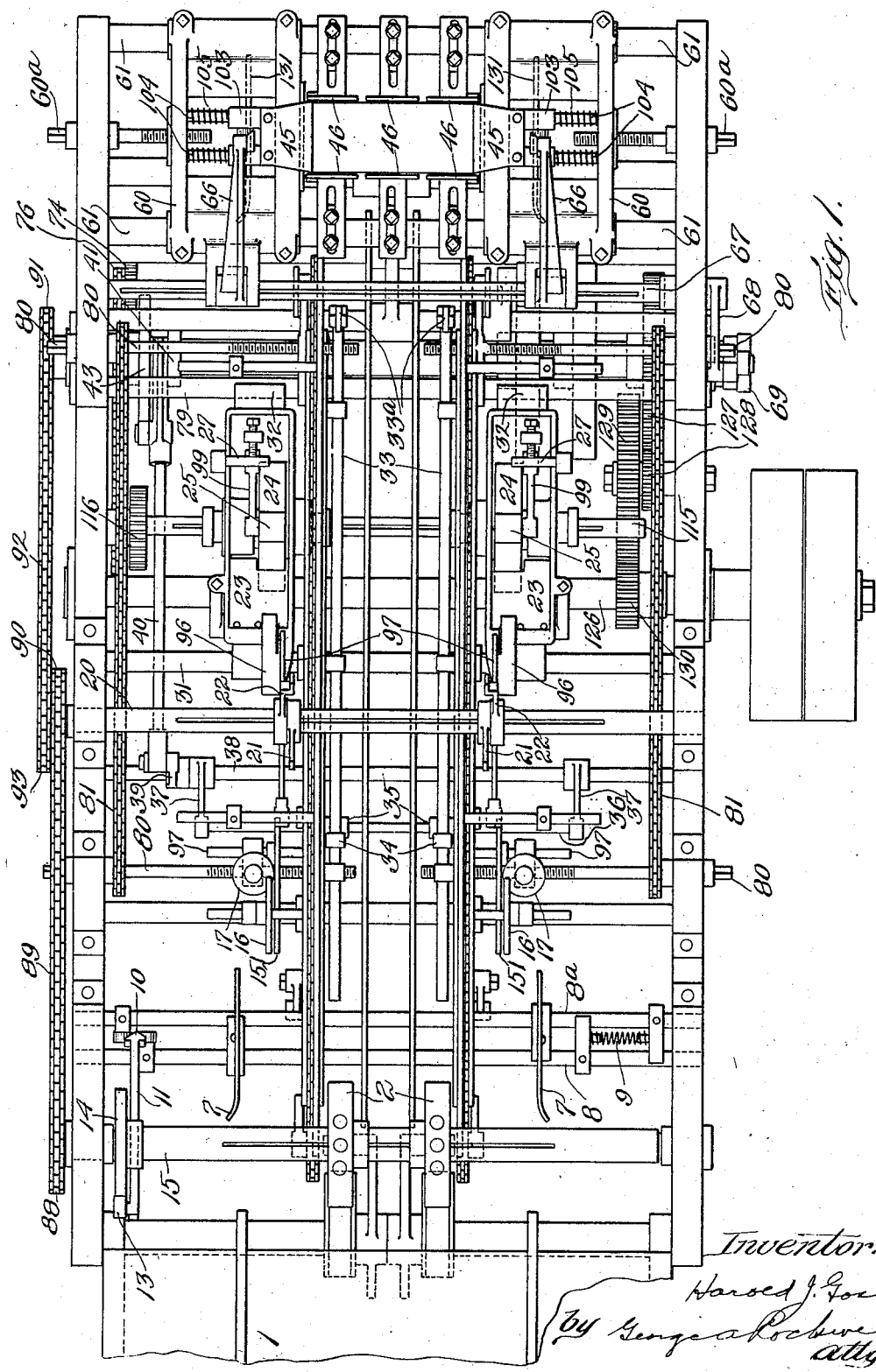
Figure 1 is a plan view of a box making machine constructed in accordance with my invention, detents 501 being omitted.

Figures 3, 4 and 5 complete a longitudinal central vertical sectional view of the machine shown in Figs. 1 and 2.

Figure 3ª is a sectional detail on line 3ª—3ª of Fig. 3.

Figures 6 and 7 are details hereinafter described.

Figure 8 is a partial elevation of the right hand end of the machine shown in Figs. 1 and 2.

Figure 9 is a section on line 9—9 of Figure 8.

Figure 10:
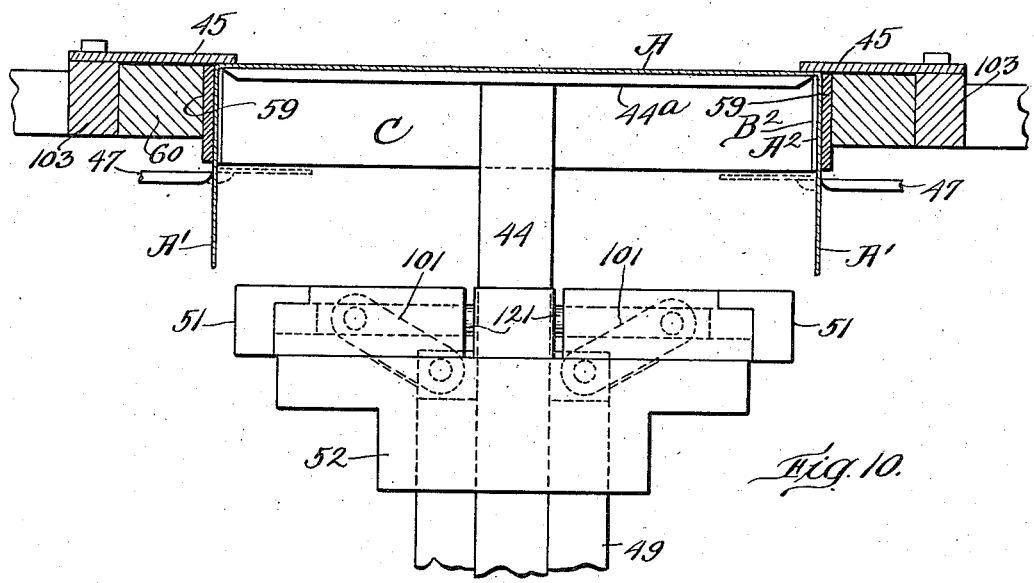
Figure 11:
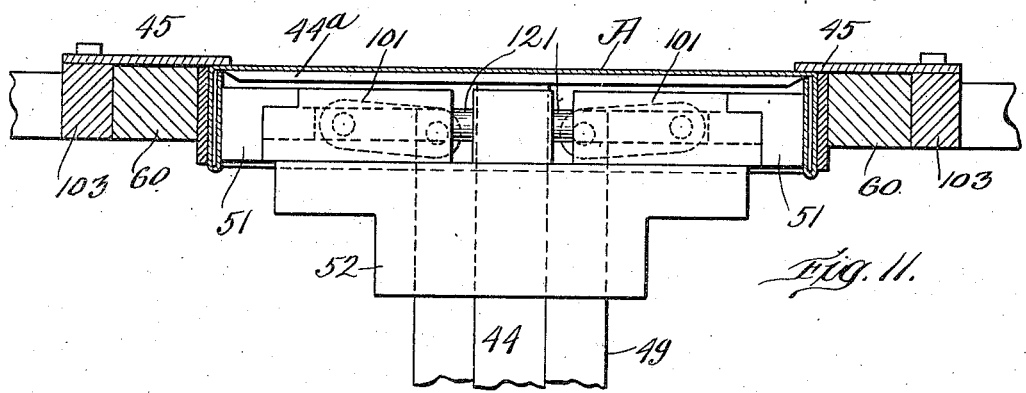

Figures 10 and 11 are details illustrating the operations of the folding plungers hereinafter described.

Figure 12:
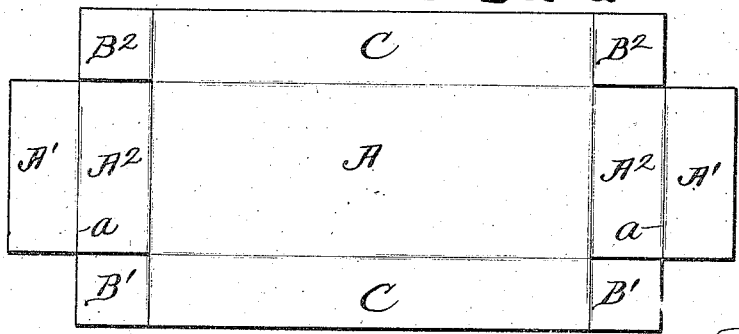

Figure 12 is a plan view of the box blank.

Figures 13, 14 and 15 are details hereinafter described.

Figure 16 is a side view of one of the wiper plates hereinafter described.

The box blanks A are fed sidewise into the machine from an inclined hopper 1 within which they are arranged in feathered relation as indicated in Fig. 3, said blanks being urged downwardly by gravity into position to be engaged by a pair of feed rolls 2 and 3. Roll 2 has rubber pads upon its periphery at one point which, during each revolution of roll 2, engage and feed forward the lower top-most blank. The lower presser roll 3 is carried by an arm 4 that is urged by a spring 4ª toward the upper roll 2. When a blank is fed between the two rolls 2 and 3 it comes into position upon two rails 5 that support a pair of endless chains 6 mounted within grooves provided upon the top sides of said rails 5. These two rails 5 are supported by two cross-bars 79, forming part of the frame of the machine, with provision for movement thereon toward and from each other. A pair of screws 80 engaging threaded holes provided through each rail 5 hold the latter in adjusted position upon cross-bars 79 and provide means by which the rail may be adjusted toward and from the center line of the machine. Each screw 80 is made with a square outer end to which a wrench or crank may be applied by which it can be rotated. Each pair of screws is connected by a chain 81 so that rotary movement imparted to one screw of the pair is transmitted to the other screw. Adjacent the hopper 1 each rail 5 has mounted thereon a sprocket 82 around which the chain of that rail passes. Within a yoke or fork at the opposite end of each rail the grooved hub of another sprocket 83 is confined, said hub being splined upon a shaft 73 so as to be movable lengthwise thereof with the rail 5 when the latter is adjusted upon its supporting bars 79. This shaft 73 is connected by gears 74, a sprocket 75, and chain 76 with a sprocket 84 fast on the continuously driven main cam shaft 42 of the machine. The slack of each chain 6 is taken up by means of an idler sprocket 85 carried by a arm 86 secured, with provision for angular adjustment, to a stud 87 projecting from the adjacent rail 5.

Each chain 6 is constructed with pins or studs 6ª appropriately spaced to accord with the movement of the feeding wheel 2. After passing the feeding wheels 2 and 3 the blank is engaged by a pair of these pins 6ª which act, if the blank is canted or does not occupy a straight position upon the chains, to straighten the same. Immediately after the blank has been picked up and straightened by two of the pins of the chains 6, blank-positioning or justifying members 7 are simultaneously moved toward each other and against the ends of the blank so as to center the latter should it be out of place laterally.

Members 7 are adjustably secured to slide bars 8 and 8ª, respectively, that are moved simultaneously endwise in opposite directions by a spring 9 and a wedge 10. The wedge 10 is part of a lever 11 fulcrumed at 12 and carrying a cam roll 13 cooperating with a cam 14 on the feed shaft 15. The feed shaft 15 carries a sprocket 88 connected by a chain 89 with a sprocket 90 fast on a shaft 20, said shaft 20 being continuously driven from the main cam shaft 42 through a sprocket 91, fast on main cam shaft 42, a chain 92 and a sprocket 93 fast on said shaft 20. The cam 14 is timed to cause the wedge 10 to move the two slide bars 8 oppositely in directions to carry the positioning members 7 toward and against the ends of the blank just after the latter has been engaged by a pair of pins on the carrier chains, said wedge cooperating with rolls 119 carried by the slide bars.

Upon leaving the side-wise adjusting member 7 the end flaps A' of the blank pass under breaker rolls 16 which bend said flaps down alongside of stationary shoes 151 which support end portions of the blank immediately inside of the flaps A'. This produces sharp folds at $a$. While the flaps A' are held down by the rolls 16, they pass side pressing rolls 17 which complete the folds $a$. Each breaker roll 16 is supported by an arm 94 adjustably fixed upon a stud 95 projecting from the adjacent rail 5.

Each roll 17 is carried by a bracket that is adjustably fastened to a stud 97 also projecting from the adjacent rail 5. Thus when the rails 5 are adjusted laterally toward or from each other the rolls 16 and 17 move with them.

After leaving the rolls 16 and 17 the chains carry the blank under the continuously rotating shaft 20 carrying two pairs of arms 21 and 22. These are timed so that the arms 21 fold the flaps B' down alongside of the rails 5 while the arms 22 fold the flaps B² down alongside of said rails, leaving the middle double flap A' A² undisturbed. While thus held folded down by arms 21 and 22, each pair of flaps B' and B² passes into position first between a deflector 96 and the adjacent rail 5 and thence between the side of a glue pot 23 and the adjacent rail. Thus these two flaps are held out of position to contact with the glue-applying roll 24 of pot 23. Each deflector 96 is a plate of sheet metal fastened to one end of the adjacent glue pot 23 so as to engage the blank as it approaches the latter, said deflector having cooperating with it a presser foot 97 consisting of a spring arm one end of which is rigidly fastened to the frame of the machine with its free end bearing yieldingly against the top of the deflector immediately inside of an elevated side portion 98 of the latter. See Figs. 13 and 14. As each double end flap A' A² of the blank passes over the deflector 96 in its path the spring presser arm 97 engages said double flap about on the line of the fold $a$ while the end section A' of the said intermediate double flap rides against the elevated portion 98 of deflector 96. As a result the two sections A' and A² are swung relatively on the fold $a$ in a direction opposite to that in which they are moved relatively by the breaker wheel 16 thereby making the joint at the fold $a$ very flexible in preparation for the folding operations that occur later. After leaving the deflectors 96 the double end flaps A' A² pass over glue applying rolls 24 by means of which glue is applied to the under sides of said flaps. The flaps are held in contact with the glue rolls by presser rolls 25. Each presser roll 25 is carried by an arm 99 pivotally mounted upon a stud 26 and urged toward the roll 24 by a spring, a stop 27 preventing contact of roll 25 with a glue roll 24.

The glue pot is supported by one of the bars 79 and the bar 31, a hook shaped lug 32ª at one side of the box engaging the former and a plain lug at the opposite end of the box resting upon the latter. These glue pots are adjustable on bars 79 and 31 toward and from each other when the rails 5 are adjusted.

After leaving the glue pot 23 the blank is engaged and carried forward at a greater speed than the chains 6 are moving by two pushers 33, Fig. 1, which, at the end of their feeding stroke, leave the blank in position to be operated upon by the folding mechanism. Each pusher 33 is a rod having a spring pressed latch 33ª mounted at one end thereof and is slidably mounted in lugs upon the inner side of the adjacent chain-supporting rail 5. Each rod 33 has fastened on it a collar 34 made with a depending stud slidably engaging a bracket 35 which in turn is slidably mounted upon a bar 36. The bar is carried by two arms 37 fulcrumed at 38 upon a rock-shaft that carries an arm 39 to which a slide bar 40 is connected. This slide bar is forked at one end and straddles a collar 41 on the main cam shaft 42, a cam roll on said slide bar being held against a cam 43 on said shaft by a spring.

After the blank is delivered to the folding mechanism by the pushers 33 a plunger 44 is lifted, carrying the blank upwardly against two plates 45 which overlap the body of the blank at their inner ends about a quarter of an inch. These plates serve as up-stops for the blank. See Figs. 10 and 11. When thus lifted by the plunger 44 a set of folders 46 wipe the side flaps C downwardly and at the same time a pair of members 47 wipe the double end flaps A' A² downwardly. As the blank is thus lifted by plunger 44 fingers 48 on the end folders or wipers 46, turn the small flaps B' B² downwardly just prior to the downward movement of the side flaps C and double end flaps A' A² so that when the end flaps A' A² are immediately thereafter turned downwardly by engagement with the wipers 47, said small flaps B' B² will be inside of the end flaps A' A². After plunger 44 has reached its uppermost position and come to rest a second plunger 49 is lifted. At the start of this movement of the second plunger 49 rolls 50 carried thereby act through arms 510 to move the wipers 47 inwardly, and the inner end of the latter act to bend the end flap sections A' inwardly. Continued upward movement of the second plunger 49 causes jaws 51 at the upper end thereof to engage the inwardly bent end flap sections A' and fold the same upwardly against the inturned small flaps B' and B². The jaws 51 are slidably mounted upon, and connected with, the top of a sleeve 52 that is normally urged upwardly by springs 53 surrounding rods 54 that are fast at their upper ends to said sleeve. These springs bear at one end against the sleeve 52 and at their opposite ends against lugs projecting from the second plunger 49. The rods 54 extend downwardly loosely through the lugs of plunger 49 and also loosely through lugs 55 projecting from the frame of the machine. Below the lugs 55 the rods 54 have stop nuts 56 mounted upon them. Stop collars 57 on rods 54 limit the upward movement of the latter under the influence of springs 53.

When the second plunger 49 is moved far enough upwardly to bring the stop nuts 56, against the lugs 55 on the frame, further upward movement of the sleeve 52 with said second plunger is prevented, and the continued upward movement of the second plunger thereafter causes the latter to act through toggle links 101 to shove the two jaws 51 outwardly to clamp the folded together flaps between said jaws 51 and plates or jaws 59. This outward clamping movement of the jaws 51 occurs when the latter have passed into position fully within the folded box. The plates or jaws 59 are secured to the inner ends of supports 60 that are adjustably mounted upon and clamped fixedly to a pair of cross bars 61 forming part of the frame of the machine. After the end flaps have been thus folded inwardly and pressed into intimate contact the top plates 45 are moved outwardly from their positions above the end portions of the box, and at about this time also, the second plunger 49 is moved downwardly sufficiently to draw together the jaws 51 so as to free the box. Immediately thereafter the first plunger 44 is given a further upward movement which carries the lower edges of the side flaps C into position just above spring pressed latches 62 carried by some of the wiper plates 46. Now, when the two plungers 44 and 49, move downwardly to their normal positions the latches 62 hold the box elevated and prevent it from following downward.

During the passage of the blank through the machine it is supported by the rails 5 and a pair of intermediate rails 102, said blank being held against upward displacement by rails 63 disposed above its path and connected by brackets with the rails 5.

Adjustable stops 64 limit the movement of the blank under the influence of the pushers 33 and position said blank with relation to the plunger 44. As each blank is moved forward by the pushers 33 it passes under a pair of spring detents 501 whose free ends spring downwardly slightly after the blank has passed and serve to prevent rebounding or return movement of said blank.

The top plates 45 of the folding mechanism are mounted upon small carriages 103 slidably mounted upon rods 104, said carriages being moved in one direction by springs 105 and in the opposite direction by cam wedges 106 provided at the ends of levers 66 which engage rolls on said carriages. The levers 66 have their hubs splined on a rock-shaft 67, said hubs being located within forks provided upon the supports 60. Outside of one of the side frames of the machine the shaft 67 is provided with an arm 68 to which is connected the upper end of a rod 107 provided at its lower end with a yoke embracing cam shaft 42 and carrying a cam roll engaged by a cam 69 on said shaft.

A cam 108 on cam shaft 42 acts through a lever arm 109; rock shaft 110; lever arm 111 and link 112 to lift plunger 44, said plunger being returned to its normal lowermost position by gravity and a spring 113 connected with arm 111 while a cam 114 on said shaft acts through a lever arm 112; rock shaft 123; lever arm 124 and link 125 to control and operate the other plunger 49.

The glue applying rolls 24 are splined upon a shaft 115 extending across the machine through both pots 23, and near one side of the machine said shaft has mounted thereon a gear 116 driven by a gear 117. The gear 117 is journaled upon a stud projecting from the adjacent side of the machine and is compounded with a sprocket 118. The chain 76, referred to above, extends around and drives this sprocket and the latter acts through gears 116 and 117 to rotate shaft 115 and the glue rolls carried by it.

The plunger 49 is a channel-iron shaped bar slidably mounted in ways 120 on the frame of the machine while the plunger 44 is slidably confined within the plunger 49. The inner ends of the toggle links 101 are pivotally connected with the outer plunger 49 while their outer ends are pivotally connected with the jaws 51. These jaws slidably engage rods 121 fastened at their inner ends to small blocks secured to the top of sleeve 52.

The main cam shaft 42 may be connected with a drive shaft 126 by a train of gears 127, 128, 129 and 130.

Side guide rails 131 adjustably supported adjacent the upper ends of the plungers prevent sidewise displacement of the blank as it is moved into position upon the top of plunger 44 by the pushers 33.

The rails 5 together with parts carried thereby; the justifying members 7; the pairs of arms 21, 22; the glue pots 23; arms 66; supports 60; wiper plates 46; side guides 131; and wipers 47, are all supported with provision for adjustment toward and from each other to adapt the machine to blanks of different sizes. The end stops 64 are also mounted upon a cross-bar 132 with provision for adjustment toward and from the plungers for the same reason. Of course in changing from one size of box to another it will sometimes be necessary or desirable to substitute plates 45 and jaws 51 of appropriate width and for this reason said parts are made removable.

A feature of advantage of my invention is that the corner flaps of the blank are bent down while the blank is moving. This saves time and gives better results because the chains are guided and the blanks remain accurately in position so that the bending elements strike the blank accurately.

Another feature of advantage of my internal expansible plunger is that it makes perfect work and gives positive control and results in increase of speed and no spoilage.

Another feature of advantage is the quick adjustment for different sizes of blanks which permits change of position of the feed rolls and of the folding arms.

Another feature of advantage is that all moving parts are positive and accurate in their action.

Another feature of advantage is that the roll 25 may be raised to permit the passage of two blanks in case, by accident, two blanks should be fed together, one above the other.

Other features of advantage will be clear from the above description of the structure and operation of the machine.

What I claim is:

1. A machine of the character described having, in combination, folding mechanism; a hopper; a pair of endless traveling conveyers positively engaging the blanks to transport the same from the hopper toward the folding mechanism; means for transferring the blanks, one at a time, from the hopper to said conveyers, glue applying mechanism between the hopper and the folding mechanism including a pair of glue transferring rolls, and means for controlling the end flaps of the blank to permit of the engagement of some of said end flaps with said rolls to the exclusion of others.

2. A machine of the character described having, in combination, folding mechanism; a hopper; a pair of endless traveling conveyers positively engaging the blanks to transport the same from the hopper toward the folding mechanism; means for transferring the blanks, one at a time, from the hopper to said conveyers, glue applying mechanism between the hopper and the folding mechanism including a pair of glue transferring rolls, and means for controlling the end flaps of the blank so as to permit of the engagement of the intermediate end flaps with said rolls to the exclusion of the corner flaps.

3. A machine of the character described having, in combination, folding mechanism; a hopper; a pair of endless traveling conveyers positively engaging the blanks to transport the same from the hopper toward the folding mechanism; means for transferring the blanks, one at a time, from the hopper to said conveyers, glue applying mechanism between the hopper and the folding mechanism including a pair of glue transferring rolls, and means including rotating flap engaging members between said hopper and folding mechanism for deflecting the corner flaps of the blank so as to allow only the intermediate end flaps to engage said glue transferring rolls.

4. A machine of the character described having, in combination, folding mechanism; a hopper; a pair of endless traveling conveyers positively engaging the blanks to transport the same from the hopper toward the folding mechanism; means for transferring the blanks, one at a time, from the hopper to said conveyers, glue applying mechanism between the hopper and the folding mechanism including a pair of glue transferring rolls, and means including rotating flap engaging members positioned between said hopper and said folding mechanism for breaking the corner flaps of the blank.

5. A machine of the character described comprising glue applying mechanism; means for feeding blanks to said mechanism; and means for deflecting the corner flaps of the blank during said feeding.

6. A machine of the character described comprising glue applying mechanism; means for feeding blanks to said mechanism; and rotating means for deflecting the corner flaps of the blank during said feeding.

7. A machine for feeding blanks comprising a member to engage a blank at one side to position it laterally; a member to engage the blank at the opposite side to position it laterally; a wedge to move said members relatively in one direction; a spring to move said members relatively in the opposite direction; and means to feed the blank.

8. A machine for making double-end set-up boxes comprising means for feeding a blank which has end flaps; and means for bending the outer portions of said end flaps.

9. A machine of the character described comprising means for feeding a blank which has end flaps; shoes for supporting the inner portions of the flaps; means for breaking down the outer portions of said flaps to substantially vertical positions; and means to bend said outer portions inwardly beyond the vertical positions.

10. A machine of the character described comprising means for feeding a blank having end flaps; means to bend the outer portions of said flaps below the horizontal; and means to bend said outer portions back to the horizontal.

11. A machine of the character described comprising glue applying mechanism; means to feed a blank having an end flap to said mechanism; means to break downwardly the outer portion of said flap; a spring arm to prevent bending of the inner portion of said flap; and an elevated plate to swing upwardly the outer end of the flap while said spring arm is acting and while the blank is being fed.

12. A machine of the character described comprising means for applying glue to certain portions of a blank; means for conveying the blank past said glue applying means; pushers; a spring-pressed latch at the active end of each pusher to engage the blank; and means to advance said pushers at a speed faster than the speed of said conveyers.

13. A machine for folding blanks which have corner flaps, side flaps, and double end flaps comprising a compartment bordered by side and end wipers; a plunger disposed below said compartment to receive a blank; means for raising said plunger to carry the blank upwardly into said compartment thereby causing wipers to fold downwardly the flaps of the blank with the corner flaps occupying positions inside of the intermediate end flaps of the blank while the body portion of the latter is supported by said plunger; means for operating the end wipers to fold inwardly the outer portions of the end flaps; a sleeve surrounding said plunger and movable relatively thereto; presser jaws movably mounted upon said sleeve and normally occupying retracted positions; means for raising said sleeve to position said jaws within the partially folded blank and to fold upwardly the inturned outer portions of the end flaps; means for projecting the jaws to cause the same to press said inturned and upwardly folded end flap portions against the corner flaps; and means for retracting said jaws and restoring the plunger and sleeve to their normal positions again.

14. A machine for folding blanks which have corner flaps, side flaps, and double end flaps comprising a compartment bordered by side and end wipers; a plunger disposed below said compartment to receive a blank; means for raising said plunger to carry the blank upwardly into said compartment thereby causing wipers to fold downwardly the flaps of the blank with the corner flaps occupying positions inside of the intermediate end flaps of the blank while the body portion of the latter is supported by said plunger; means for operating the end wipers to fold inwardly the outer portions of the end flaps; a sleeve surrounding said plunger and movable relatively thereto; presser jaws movably mounted upon said sleeve and normally occupying retracted positions; means for raising said sleeve to position said jaws within the partially folded blank and to fold upwardly the inturned outer portions of the end flaps; means for projecting the jaws to cause the same to press said inturned and upwardly folded end flap portions against the corner flaps; and means for retracting said jaws and restoring the plunger and sleeve to their normal positions again; means for retracting said jaws and thereafter imparting a second upward movement to said plunger; means for lowering said sleeve and plunger to their normal lowermost positions again, and means for holding the completed box against movement downward with said plunger.

15. A machine of the character described including folding mechanism comprising a compartment bordered by side and end wipers; a plunger disposed below said compartment; means for delivering box blanks, one at a time into position upon said plunger; means for raising said plunger to carry the blank upwardly into said compartment thereby causing the wipers to fold downwardly the flaps of the blank with the corner flaps occupying positions inside of the intermediate end flaps of the blank while the body portion of the latter is supported by said plunger; means for operating the end wipers to fold inwardly the outer sections of the end flaps; a sleeve surrounding said plunger and movable relatively thereto; presser jaws movably mounted upon said sleeve and normally occupying retracted positions; means for raising said sleeve to position said jaws within the box and to fold upwardly the inturned outer sections of the end flaps; means for projecting the jaws to cause the same to press said inturned and upwardly folded end flap sections against the corner flaps, and means for retracting said jaws and restoring the plunger and sleeve to their normal positions again.

16. A machine of the character described including folding mechanism comprising a compartment bordered by side and end wipers; a plunger disposed below said compartment; means for delivering box blanks, one at a time into position upon said plunger; means for raising said plunger to carry the blank upwardly into said compartment thereby causing the wipers to fold downwardly the flaps of the blank with the corner flaps occupying positions inside of the intermediate end flaps of the blank while the body portion of the latter is supported by said plunger; means for operating the end wipers to fold inwardly the outer sections of the end flaps; a sleeve surrounding said plunger and movable relatively thereto; presser jaws movably mounted upon said sleeve and normally occupying retracted positions; means for raising said sleeve to position said jaws within the box and to fold upwardly the inturned outer sections of the end flaps; means for projecting the jaws to cause the same to press said inturned and upwardly folded end flap sections against the corner flaps, means for retracting said jaws and thereafter imparting a second upward movement to said plunger; means for lowering said sleeve and plunger to their normal lowermost positions again, and means for holding the completed box against movement downward with said plunger.

HAROLD J. GOSS.